United States Patent [19]

Felix et al.

[11] 4,161,352

[45] Jul. 17, 1979

[54] VEHICLE MOUNTED SURVEILLANCE APPARATUS

[76] Inventors: Larry L. Felix, 1250 Manzanita, Canby, Oreg. 97013; Norman P. Fandrei, 3822 SE. Spaulding, Milwaukie, Oreg. 97222

[21] Appl. No.: 777,062

[22] Filed: Mar. 14, 1977

[51] Int. Cl.² .............................................. G02B 23/08
[52] U.S. Cl. ................................................... 350/301
[58] Field of Search ............. 350/301, 302, 52, 22–26

[56] References Cited

U.S. PATENT DOCUMENTS

| | | | |
|---|---|---|---|
| 826,155 | 7/1906 | Dudley | 350/301 |
| 1,102,046 | 6/1914 | Hanson | 350/301 |

FOREIGN PATENT DOCUMENTS 458196  3/1928  Fed. Rep. of Germany ........... 350/302

*Primary Examiner*—Jon W. Henry
*Attorney, Agent, or Firm*—Kolisch, Hartwell, Dickinson & Stuart

[57] ABSTRACT

Apparatus for use in surveillance from a vehicle includes an adapter which is mounted adjacent to a wall opening in the vehicle and a casing which is rotatably mounted on the adapter. Mounted within the casing is an extendible-retractable scope for selective shifting through the wall opening. The scope includes a pair of opposed mirror surfaces for reflecting images from outside the vehicle to the inside.

7 Claims, 4 Drawing Figures

VEHICLE MOUNTED SURVEILLANCE APPARATUS

BACKGROUND AND SUMMARY OF THE INVENTION

The present invention relates to surveillance devices, and more particularly to a surveillance device of the so-called periscope type adapted for mounting on a vehicle.

Effective suveillance in law enforcement or evidence gathering requires that individuals conducting the surveillance remain undetected. For instance, everyone is familiar with policemen or detectives observing subjects or activities from prowl cars or other vehicles. Because subjects can view the occupants of such vehicles, detection may result thus eliminating the possibilities for observation of criminal or other activities.

In order to diminish the chances of detection, the use of van-type vehicles has been suggested. However, such vehicles often include windows in their side panels which permit detection. If curtains are used, it may be difficult for observers to gather information without disturbing the curtains and providing movement which can be detected.

Accordingly, it is a general object of the present invention to provide a surveillance apparatus of the so-called periscope type which may be readily adapted for use on a vehicle. More specifically, it is an object of the present invention to provide an apparatus including a scope which may be adapted to extend upwardly through a wall opening or air vent on the vehicle. Such air vents are typically situated on the roof of a vehicle and thus provide an opening through which the scope may extend for observation purposes with limited detection.

In order to accomplish the above described objects, the present invention contemplates an apparatus in which a casing is secured to the roof of a vehicle adjacent an air vent opening and extends into the interior. Slidably disposed within the casing is an extendible-retractable scope having opposed reflecting surfaces. The scope is connected to the casing so that rotation of the casing imparts simultaneous rotation to the scope. The opposed reflecting surfaces transfer images from outside of the vehicle to the inside for viewing by an observer.

These and other objects and attendant advantages of the present invention will be more readily understood from a consideration of the drawings and the following detailed description.

DETAILED DESCRIPTION OF A PREFERRED EMBODIMENT

Figure 1:
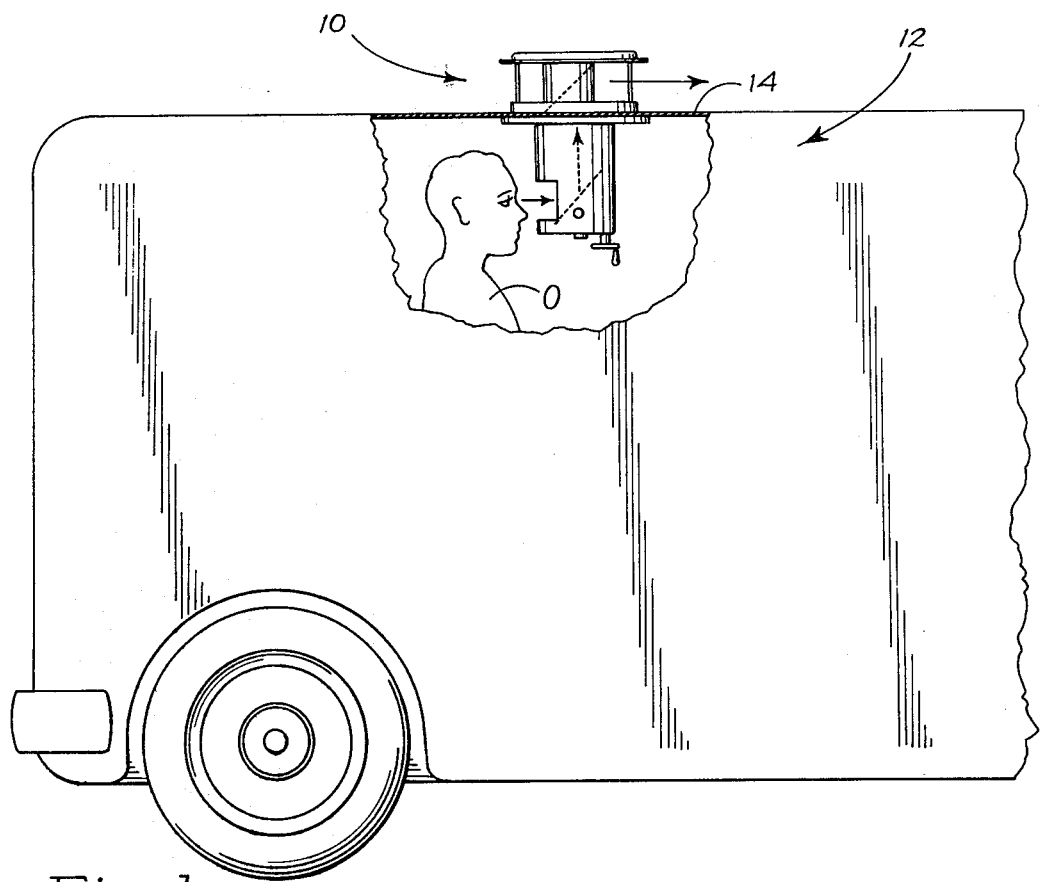
FIG. 1 is a side elevational view of a van-type vehicle with side wall portions cut away for illustrating the placement of a surveillance apparatus in accordance with the present invention.

Turning now to the drawings, and referring initially to FIG. 1, a surveillance apparatus in accordance with the present invention is generally indicated at 10. Apparatus 10 is mounted to a vehicle 12 on its roof 14. As shown in the figure, an observer O within vehicle 12 can view activity occurring outside the vehicle.

Figure 2:
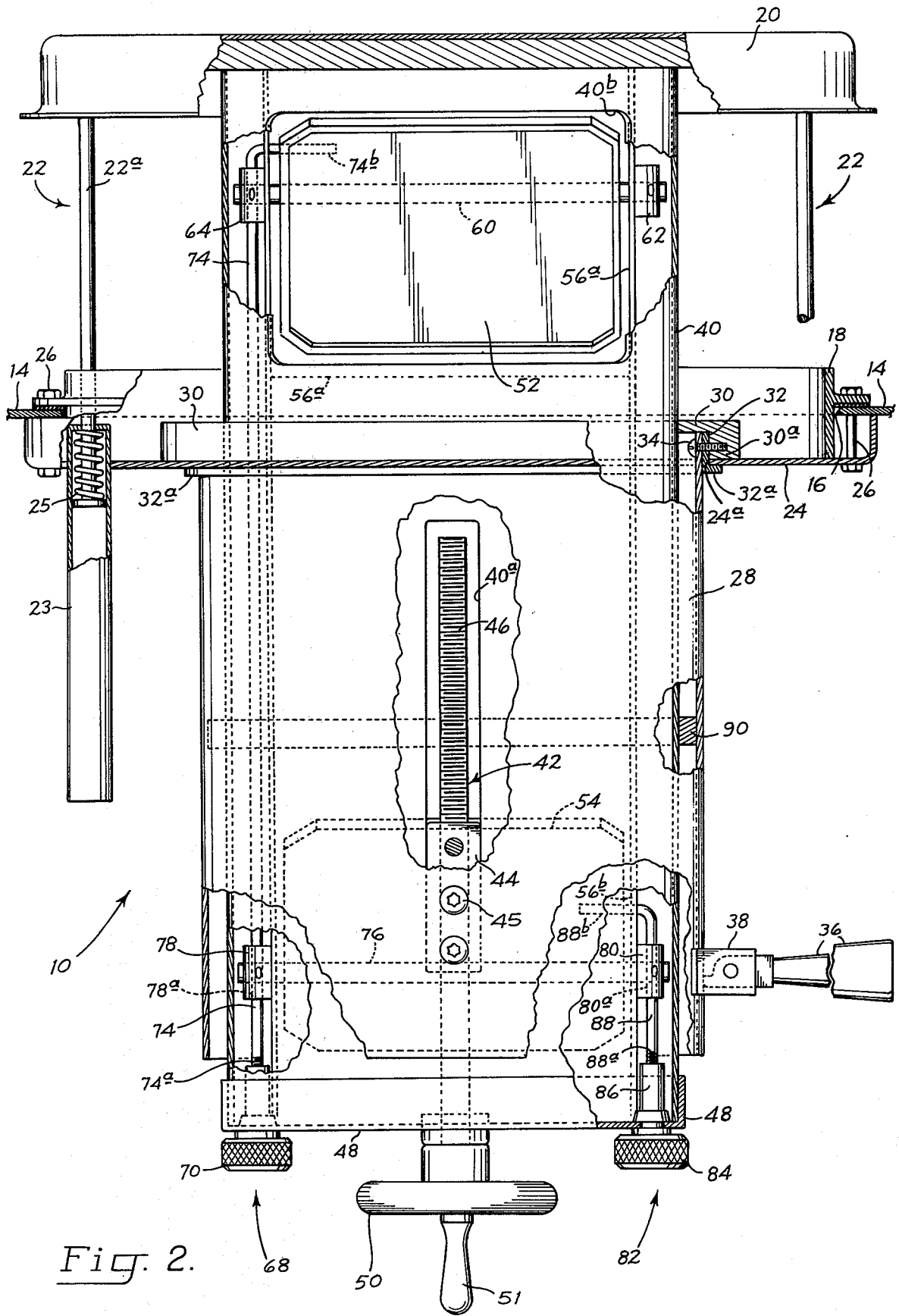
FIG. 2 is an enlarged, front elevational view of the surveillance apparatus shown in FIG. 1 having portions cut away to illustrate details of its internal construction.
Figure 3:
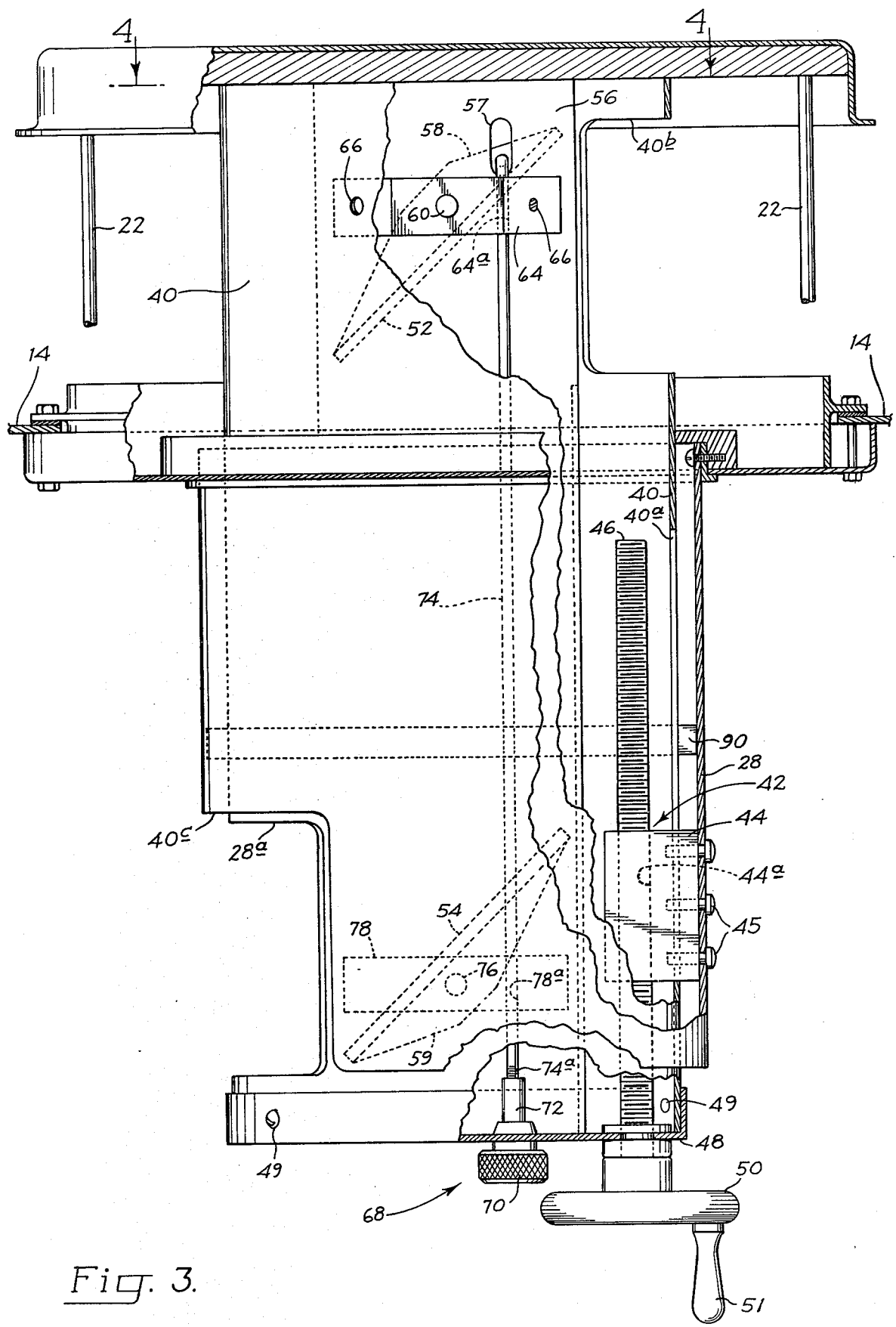
FIG. 3 is an enlarged, side elevational view of the surveillance apparatus shown in FIG. 1 with portions cut away.

With attention now directed to FIGS. 2 and 3, constructional details of apparatus 10 will be described. Apparatus 10 is contemplated as being mounted in an existing opening in roof 14 of vehicle 12. A wall opening 16 is typically provided in van-type vehicles in order to provide an air vent for circulation. A lower member or seating frame 18 is connected to roof 14 within opening 16 and receives a hatch cover 20. Hatch cover 20 is extendible upwardly from frame 18 by means of adjustable posts. Such posts have been replaced with slidable arm assemblies 22, details of which will be described at a later point. As shown in FIGS. 2 and 3, apparatus 10 has been adapted to fit within opening 16 and utilizes hatch cover 20 for camouflage. Frame 18 and hatch cover 20 may be rectangular in shape and interconnected by four arm assemblies, two of which are shown in FIGS. 2 and 3.

Mounted to an inner side of roof 14 is an adapter means 24. Adapter means 24 is connected to roof 14 and frame 18 by means of suitable bolts 26. Adapter means 24 is provided with an annular aperture 24a for receiving a casing means such as cylindrical casing 28. Casing 28 is mounted to adapter means 24 by a pair of annular rims 30, 32. Rims 30, 32 are secured to casing 28 at a location adjacent its upper end, and are also secured to one another by circumferentially disposed screw fasteners such as fastener 34. Each rim 30, 32 includes radially extending lip portions such as portions 30a, 32a which are spaced apart a distance for accommodating the thickness of adapter means 24. Thus, as can be seen in FIGS. 2 and 3, portion 30a is seated upon adapter means 24 and portion 32a lies underneath adapter means 24. Casing 28 is thereby prevented from substantial movement in the direction of its longitudinal axis relative to adapter means 24.

Casing 28 is rotatably mounted within aperture 24a so that it is operable for revolving about its longitudinal axis. A stowable handle 36 is mounted to casing 28 by means of a bracket 38. Handle 36 is pivotally connected to bracket 38 and may be extended, as shown in FIG. 2, so that casing 28 may be revolved.

Disposed within casing 28 is an elongate, shiftable scope means or viewing scope indicated at 40. Scope 40 is formed as a hollow cylinder and extends upwardly through aperture 24a. Additionally, scope 40 is shiftable in the direction of its longitudinal axis through wall opening 16. Scope 40 is secured to casing 28 by means of an assembly, generally indicated at 42. Assembly 42 includes a rectangular nut means 44 which is rigidly secured to casing 28 by means of fasteners 45 and extends inwardly through an elongate slot 40a provided in scope 40. The width of slot 40a is dimensioned slightly greater than the width of nut means 44 to thereby accommodate insertion of the nut means.

Nut means 44 (see FIG. 3) is provided with a threaded bore 44a through which extends an elongate threaded shaft 46. Shaft 46 is rotatably mounted or journaled to a base or end cap 48 secured to a bottom portion of scope 40. Fasteners, such as shown at 49, secure cap 48 to scope 40. Rigidly connected to shaft 46 is a crank means 50 having a handle 51. Thus, it can be appreciated that upon rotation of crank means 50, rotation will be imparted to shaft 46 so that the shaft is displaced longitudinally within nut means 44. Accordingly, scope 40 is shiftable along its longitudinal axis relative to casing 28 for extension or retraction through wall opening 16. However, because nut means 44 is rigidly connected to casing 28 and contacts sides of slot 40a, revolving casing 28 about its longitudinal axis will also impart simultaneous revolution to scope 40 about its longitudinal axis.

An upper end of scope 40 includes a cut away portion or window 40b. Similarly, a lower portion of scope 40 includes a window 40c which is disposed adjacent a window 28a formed in casing 28. As shown in FIGS. 2 and 3, scope 40 is fully extended. A pair of opposed, reflecting means or mirrors 52, 54 are mounted within a rectangular tube generally indicated at 56. Tube 56 is mounted within scope 40. Further, tube 56 includes nonreflective walls which extend the length of scope 40 including an upper window 56a adjacent casing window 40b and a lower window 56b adjacent windows 28a, 40c.

Figure 4:
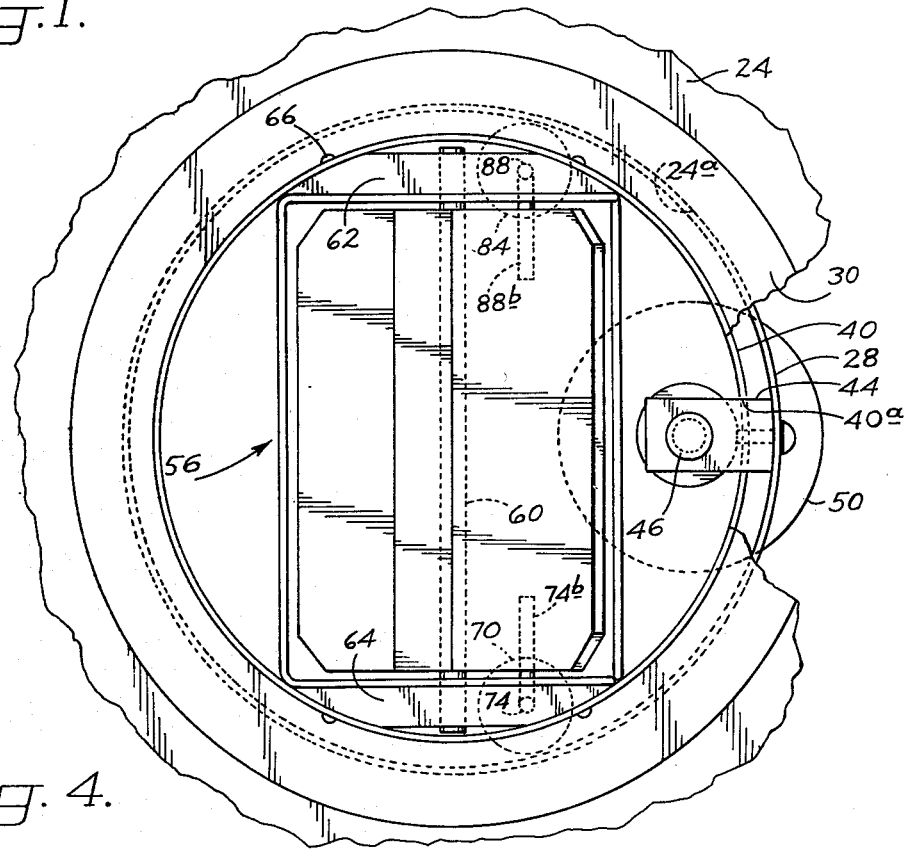
FIG. 4 is a top view taken along lines 4—4 of FIG. 3.

Mirror 52 is mounted on a supporting body 58 which is connected to an elongate pivot arm 60. Pivot arm 60 defines a pivot axis extending transversely to the longitudinal axis of scope 40 and also extends through side walls of tube 56. For instance, as shown in FIG. 4, pivot arm 60 is mounted at opposite ends in a pair of supports 62, 64. Each of supports 62, 64 is suitably secured to scope 40 by means of appropriate fasteners 66. Mirror 52 is selectively positionable about its pivot axis by means of an adjusting means generally indicated at 68. Adjusting means 68 includes a rotatable knob or knurled thumb screw 70 which is journaled to cap 48 and includes a sleeve 72 having a threaded bore rigidly connected thereto. An elongate rod 74 constructed with a first threaded end 74a is received within sleeve 72 for threaded engagement therewith. A second bent end 74b is connected to mirror body 58 and rod 74 is slidably received within a bore 64a provided in support 64. Upon rotation of thumb screw 70, rod 74 will be shifted in the direction of its longitudinal axis to pivot mirror body 58 and mirror 52 about the pivot axis defined by pivot arm 60. An elongate 57 is provided in a wall of tube 56 to accommodate vertical shifting of rod 74.

With reference now directed to the bottom portion of FIGS. 2 and 3, it can be seen that mirror 54 is mounted on a supporting mirror body 59 through which extends a pivot arm 76. Pivot arm 76 extends through tube 56 and is rotatably mounted in opposed supports 78, 80 similar to supports 62, 64. Supports 78, 80 are rigidly secured to walls of scope 40. It is to be noted that support 78 includes an aperture or bore 78a extending vertically therethrough for slidably receiving rod 74.

As shown in FIG. 2, a second adjusting means, generally indicated at 82, includes a knob or thumb screw 84 rotatably mounted on cap 48 so as to extend from its bottom side. A sleeve 86 is rigidly connected to thumb screw 84 and includes a threaded bore. An elongate rod 88 includes a first threaded end 88a which is received for threaded engagement in the bore of sleeve 86. A second end 88b is bent and received in body portion 59. Rod 88 is slidably disposed within a bore 80a provided in support 80. Thus, upon rotation of thumb screw 84 and sleeve 86, rod 88 may be shifted vertically to correspondingly pivot mirror body and mirror 54 about the pivot axis defined by pivot arm 76.

It is to also be noted that annular rim 30 includes an inwardly extending portion which contacts an annular peripheral portion of scope 40. Such contacts serve as a guide. Another annular rim 90 disposed intermediate the length of casing 28 provides additional support between the casing and scope 40.

OPERATION

The use of surveillance apparatus 10 of the present invention will now be described. Assuming that a suitable target for surveillance has been determined, vehicle 12 is transported to an area adjacent to the target. Initially, scope 40 is retracted within casing 28 so that hatch cover 20 is situated over frame 18. As shown in FIG. 2, each slidable arm assembly 22 includes a rod 22a connected to hatch cover 20 and slidably received in a guide tube 23. Tube 23 is connected to frame 18 and a biasing means urges rod 22a into tube 23. Such a biasing means is shown at 25.

In order to raise scope 40, crank 50 is rotated about its longitudinal axis so that shaft 46 is rotated through nut means 44. As shaft 46 is advanced through nut means 44, scope 40 will be raised or extended through aperture 24a and opening 16. Because hatch cover 20 is provided with rods 22a which extend upwardly, the top portion of scope 40 will be somewhat hidden by hatch cover 20.

After scope 40 has been elevated to a predetermined height, an observer, such as observer O shown in FIG. 1, manipulates handle 36 to selectively revolve casing 28 and scope 40 about their concentric longitudinal axes. By so revolving apparatus 10, mirrors 52, 54 can be situated for reflecting images from outside vehicle 12 to observer O. By selectively pivoting mirrors 52, 54 about their respective pivot axes by means of adjusting means 68, 82, respectively, the observer may view a target area as required.

Elongate tube 56 is provided with nonreflective surfaces so that only light from outside the vehicle is reflected from mirror 52 to mirror 54. Additionally, a screen (not shown) may be provided adjacent window 40b to further camouflage the apparatus and decrease reflection from mirror 52 to the outside.

The present invention provides several distinct advantages. First of all, a standard van-type vehicle may be readily modified to accommodate the surveillance apparatus of the present invention. Van-type vehicles are generally provided with air vents including a hatch cover. Thus, by providing adapter means 24 of the present invention, casing 28 and scope 40 may be readily situated so as to be mounted adjacent wall opening 16. The present invention is contemplated as integrally using hatch cover 20 to provide camouflage. It has been found that apparatus 10 can be readily used by police departments, private detectives and other organizations requiring cover during surveillance operations.

Because viewing is done through the top of the vehicle, it is not necessary to look through side windows which usually provide ready detection. Additionally, because scope 40 is mounted within the peripheral confines of hatch cover 20, extension of hatch cover 20 appears in conformance with vehicle 12. Subjects outside vehicle 12 are not aware that surveillance is occurring beneath such a hatch cover. In fact, subjects have been known to approach a vehicle, upon which the present invention is used with suspicion but have been unable to detect the use of surveillance apparatus 10.

With respect to specific features of apparatus 10, it is noted that precise control with respect to extending and retracting scope 40 within casing 28 is provided by assembly 42 and crank 50. Additionally, because nut means 44 of assembly 42 is rigidly connected to scope 28 and fits within slot 40a of scope 40, revolving casing 28 about its longitudinal axis imparts simultaneous revolution to scope 40.

By use of adjusting means 68, 82, precise positioning of mirrors 52, 54, respectively, may be obtained so that viewing of a target area or subjects may be quickly and efficiently realized.

It is to also be noted that a camera may be mounted adjacent a lower portion of window 40c so that still or moving pictures of a target area and subjects could be obtained. Such a camera and mounting would revolve with casing 28.

While the invention has been particularly shown and described with reference to the foregoing preferred embodiment thereof, it will be understood by those skilled in the art that other changes in form and detail may be made therein without departing from the spirit and scope of the invention as defined in the appended claims.

It is claimed and desired to secure by Letters Patent:

1. Apparatus for use in surveillance from a vehicle comprising:

adapter means having an aperture mounted adjacent to a wall opening in the vehicle;

casing means rotatably mounted on said adapter means operable for revolving about its longitudinal axis within the vehicle;

scope means mounted within said casing means including an assembly operable for selectively shifting said scope means in the direction of said longitudinal axis through the wall opening, said assembly including an elongate, threaded shaft rotatably connected to said scope means and a nut means rigidly secured to said casing means for receiving said shaft so that rotation of said shaft imparts longitudinal shifting to said scope means, said scope means further including an elongate slot formed in a wall portion thereof for receiving said nut means, a portion of said slot contacting said nut means during revolution of said casing means so that revolution of said casing means imparts simultaneous revolution to said scope means; and a pair of opposed, reflecting means mounted on said scope means for reflecting images from outside the vehicle to the inside.

2. The apparatus of claim 1 wherein a pair of opposed annular rims are rigidly connected to said casing means adjacent one end thereof, said rims being spaced-apart a distance for receiving a portion of said adapter means adjacent its aperture.

3. The apparatus of claim 2 wherein each of said rims includes lip means for preventing substantial movement of said casing means along its longitudinal axis relative to said adapter means.

4. The apparatus of claim 1 wherein each of said reflecting means is pivotally mounted within said scope means about an axis extending transversely to said longitudinal axis and wherein adjusting means are connected to each of said reflecting means operable for selectively pivoting an associated one of said reflecting means.

5. The apparatus of claim 4 wherein said adjusting means includes rod means extending from adjacent the bottom of said scope means to an associated one of said reflecting means, said rod means being shiftable along its longitudinal axis for pivoting said reflecting means.

6. The apparatus of claim 1 wherein adjusting means are connected to each of said reflecting means for selectively pivoting an associated one of said reflecting means about a pivot axis.

7. The apparatus of claim 6 wherein said adjusting means includes rod means extending from adjacent the bottom of said scope means to an associated one of said reflecting means, said rod means being shiftable along its longitudinal axis for pivoting said reflecting means.

* * * * *